(12) United States Patent
Markunas et al.

(10) Patent No.: US 8,169,172 B2
(45) Date of Patent: May 1, 2012

(54) SYNCHRONOUS DISTURBANCE SUPPRESSION IN A VARIABLE SPEED MOTOR DRIVE

(75) Inventors: Albert L. Markunas, Roscoe, IL (US); James J. Wrobel, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 25 days.

(21) Appl. No.: 12/772,486

(22) Filed: May 3, 2010

(65) Prior Publication Data

US 2011/0266987 A1    Nov. 3, 2011

(51) Int. Cl.
*H02P 6/06* (2006.01)

(52) U.S. Cl. ......... 318/400.24; 318/400.23; 318/400.25; 318/400.39; 318/617; 318/605; 363/39; 363/41; 363/45; 363/46; 702/75; 702/77; 324/707; 324/602; 324/76.39; 324/76.44; 324/76.21

(58) Field of Classification Search .................. 318/619, 318/617, 605, 801, 802, 800, 799, 807, 811, 318/810, 599, 400.24, 400.23, 400.25, 400.39; 363/39, 41, 45, 46; 702/75, 77; 324/707, 324/602, 76.39, 76.44, 76.21

See application file for complete search history.

(56) References Cited

U.S. PATENT DOCUMENTS

| | | | |
|---|---|---|---|
| 4,926,105 A | 5/1990 | Mischenko et al. | |
| 5,825,152 A | 10/1998 | Eriksson | |
| 5,844,397 A * | 12/1998 | Konecny et al. | 318/811 |
| 5,929,589 A | 7/1999 | Suzuki et al. | |
| 6,014,007 A | 1/2000 | Seibel et al. | |
| 6,016,043 A | 1/2000 | Motzko et al. | |
| 6,069,467 A * | 5/2000 | Jansen | 318/802 |
| 6,118,239 A * | 9/2000 | Kadah | 318/268 |
| 6,313,602 B1 * | 11/2001 | Arefeen et al. | 318/801 |
| 6,594,106 B1 | 7/2003 | Serrano et al. | |
| 6,708,134 B2 * | 3/2004 | McGaughey et al. | 702/145 |
| 6,927,548 B2 * | 8/2005 | Nishizaki et al. | 318/432 |
| 7,068,005 B2 | 6/2006 | Baker | |
| 7,109,681 B2 | 9/2006 | Baker et al. | |
| 7,242,105 B2 | 7/2007 | Mehl et al. | |
| 7,429,855 B2 | 9/2008 | Rozman | |
| 7,604,088 B2 * | 10/2009 | Nishizaki et al. | 180/446 |
| 7,884,562 B2 * | 2/2011 | Klatt | 318/400.01 |
| 2007/0107973 A1 * | 5/2007 | Jiang et al. | 180/443 |

* cited by examiner

*Primary Examiner* — Rita Leykin

(74) *Attorney, Agent, or Firm* — Carlson, Gaskey & Olds, PC

(57) ABSTRACT

A variable speed drive for an electric motor has an inverter for receiving pulse width modulation controls. The inverter communicates power signals to a poly-phase electrical motor. A resolver communicates signals from the poly-phase motor back to a motor control. The motor control includes a speed control, a field-oriented control, and a pulse width modulation drive for driving the inverter. The resolver is connected to the speed control and to the field-oriented control, and further communicates with a synchronous compensator. The synchronous compensator is configured to drive the harmonic content at a target frequency or frequencies in a selected signal towards zero over time.

18 Claims, 5 Drawing Sheets

US 8,169,172 B2

SYNCHRONOUS DISTURBANCE SUPPRESSION IN A VARIABLE SPEED MOTOR DRIVE

BACKGROUND

This application relates to a synchronous compensator for a variable speed motor drive.

Modern variable speed motor drives typically use a rotor position sensor for determining the position of the motor rotor, and for commutating inverter switches from one pattern to the next. A device called a resolver is commonly used to sense rotor position and provide feedback. Systematic errors in the determination of the rotor position introduce errors into a variable speed motor drive speed and a current loop, and can produce undesirable operational characteristics.

The resolver error can introduce rotor synchronous errors into position output that occur at harmonics of once per resolver electrical revolution. This is also once per mechanical revolution for a two-pole resolver, and P/2 per mechanical revolution for a P-pole resolver.

These synchronous resolver errors can introduce synchronous speed and current oscillation into the variable speed drive operation. This can result in undesirable cyclic variations in input current and/or electrical power draw. Cyclical variations in the input current and power draw can reduce a variable speed drive's performance. Also, such variations can violate electrical load power quality requirements, like current modulation, in tightly specified load equipment applications such as those found on aircraft.

Additionally, variable speed drives are often used to drive loads that are cyclic in nature. As an example, positive displacement pumps or compressors have cyclic torques associated with their loads, which can cause cyclic speed and current pulsations. This can also result in input current and power oscillations at the variable speed drive that may reduce system performance. These pulsations can also violate electrical load power quality requirements, like current modulation, in tightly specified load equipment applications such as those found on aircraft. That is, load power quality is measured at the load input electric terminals. It can be violated if the above-mentioned pulsations cause input current and power oscillations that violate a specification.

Speed and current control loops for a variable speed drive have been designed and tuned to meet a multitude of system performance requirements. As an example, transient response, stability margins, electrical input impedance, overall efficiency, and steady state accuracy are all addressed. The resulting control loop architectures and associated parameters may unintentionally actually make the sensitivity of the variable speed drive worse to resolver synchronous errors, and to cyclic or pulsating loads.

SUMMARY

A variable speed drive for an electric motor has an inverter for receiving pulse width modulation controls. The inverter communicates power signals to a poly-phase electrical motor. A resolver communicates signals from the poly-phase motor back to a motor control. The motor control includes a speed control, a field-oriented control, and a pulse width modulation drive for driving the inverter. The resolver is connected to the speed control and to the field-oriented control, and further communicates with a synchronous compensator. The synchronous compensator is configured to drive targeted harmonic content in a signal towards zero over time.

These and other features of the present invention can be best understood from the following specification and drawings, the following of which is a brief description.

DETAILED DESCRIPTION

Figure 1:
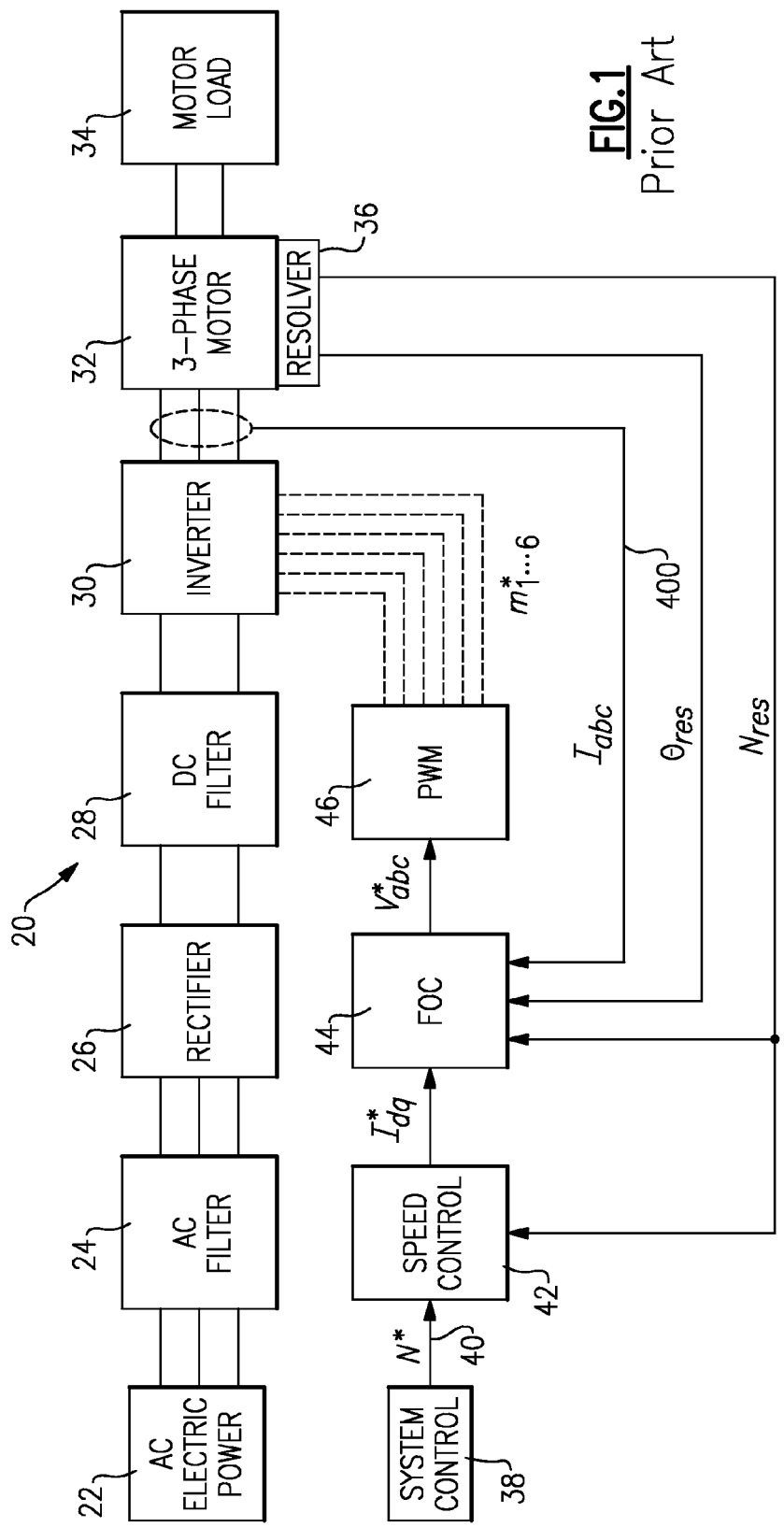
FIG. 1 shows a prior art variable speed drive system.

FIG. 1 is a block diagram representation of a known variable speed drive 20 with a source of electrical power 22. AC power flows through an AC filter 24, to a rectifier 26. The rectifier 26 converts the AC power into DC power which passes through a DC filter 28, to an inverter 30, and to a three-phase motor 32. Three-phase motor 32 drives a motor load 34. In one embodiment, the motor load 34 has a cyclic torque load. As one example, the motor load 34 is a positive displacement pump or compressor.

As known, a resolver 36, including a resolver electromechanical apparatus plus a resolver modulation/demodulation circuitry, is associated with the three-phase motor 32 to provide $\theta_{res}$ (position or angle) and $N_{res}$ (speed) feedback to a control. A system control 38 provides a desired motor speed signal N* at line 40 into a speed control 42. Feedback of the resolver speed signal $N_{res}$ extends back to the speed control 42, and to a field-oriented control 44. The field-oriented control 44 also receives an angle signal $\theta_{res}$ from the resolver 36, and a three-phase current signal $I_{abc}$ from a point intermediate the inverter 30 and the three-phase motor 32. The field-oriented control 44 provides a three-phase voltage command signal $V^*_{abc}$ to a pulse width modulation control 46. The pulse width modulation control 46 sends control signals to the inverter 30.

Figure 2:
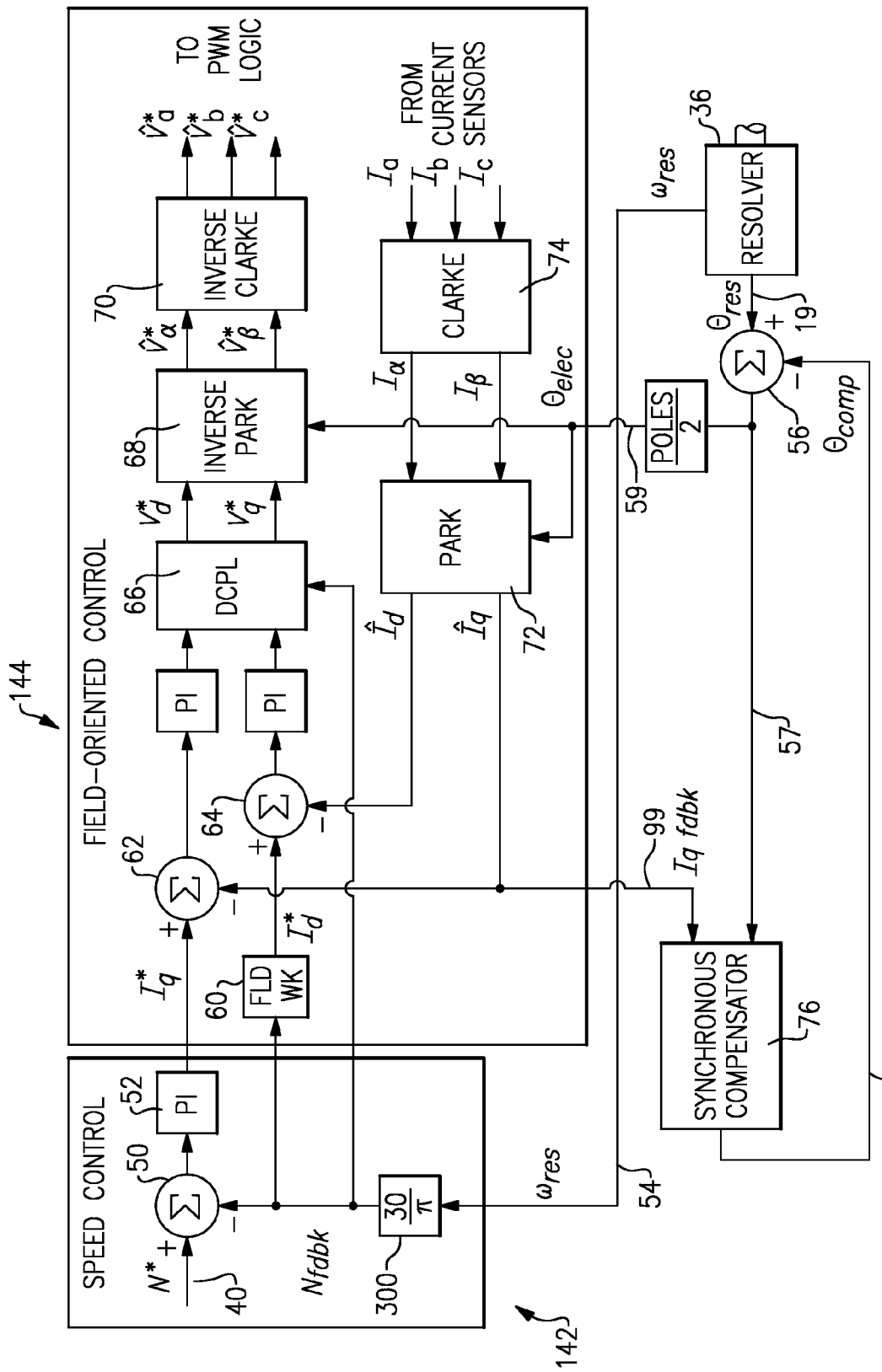
FIG. 2 shows an inventive motor control block diagram which improves upon a portion of the FIG. 1 system.

This system has some limitations with regard to synchronous disturbances, as set forth above. Thus, as shown in FIG. 2, the present invention modifies the speed control 42 and field-oriented control 44 of FIG. 1. The field-oriented control 144 is shown in FIG. 2, as is the speed control 142. Further, a new component, a synchronous compensator 76 is provided. The resolver 36 sends the $\theta_{res}$ signal 19 to a summation block 56. Further, a $\theta_{comp}$ signal passes from the synchronous compensator 76 to the summation block 56 via line 78. The summation block 56 sends a signal at 57 to the synchronous compensator 76. Further, a signal 59 passes downstream of the summation block 56 into the field-oriented control 144, as will be explained below.

The speed demand signal 40 passes to a speed error summation block 50, and to a proportional plus integral (PI) speed control block 52. The output passes into the field-oriented control 144 as a q-axis current command signal $I^*_q$. This signal passes to a current error summation block 62, and then downstream to a PI q-axis current control block, and a decoupler 66 for the purposes of making the q and d-axis current controllers independent of one another. Downstream of the decoupler 66 is an inverse Park transformation block 68. Downstream of the block 68 is an inverse Clarke transformation block 70. This extends back to the pulse width modulation control 46 as shown in FIG. 1. The Park and Clarke transformations and their respective inverses are well known in the variable speed motor drive art.

In parallel, a speed feedback signal $\omega_{res}$ from the resolver 36 is passed on line 54 and scaled to proper units by block 300, and extends into the speed control 142, and to the speed error summation block 50. It is the difference between the signal N* and $N_{fdbk}$, which is sent from the summation block 50, and which then sends the signal to the proportional plus integral speed control 52. Further, the signal $N_{fdbk}$ extends to a field weakening block 60. The field weakening block 60 has the function of reducing the field as the motor runs faster. This control is for reasons as is known in the art. The d-axis current command signal $I^*_d$ downstream of the field weakening block 60 passes to a current error summation block 64, along with the d-axis current feedback signal output from the Park transformation block 72.

The motor electrical angle signal 59 also passes to the inverse Park transformation block 68 and the Park transformation block 72. Three-phase motor current input 74 from current sensors associated with line 400 also extends into a Clarke transformation block 74. These signals are sent to the Park transformation block 72, completing the transformation from the physical abc coordinates of the motor currents to the dq coordinates of the field oriented control as is well known in the art.

It is also known that the Park and Clarke blocks can be combined as a single component, and that would be true with regard to the circuits disclosed in this application. While the system is specifically disclosed with a three-phase motor, it would apply to any poly-phase motor.

The synchronous compensator 76 also receives a q-axis current feedback signal $I_{qfdbk}$ at 99, which is generated from the Park transformation block 72.

Figure 3:
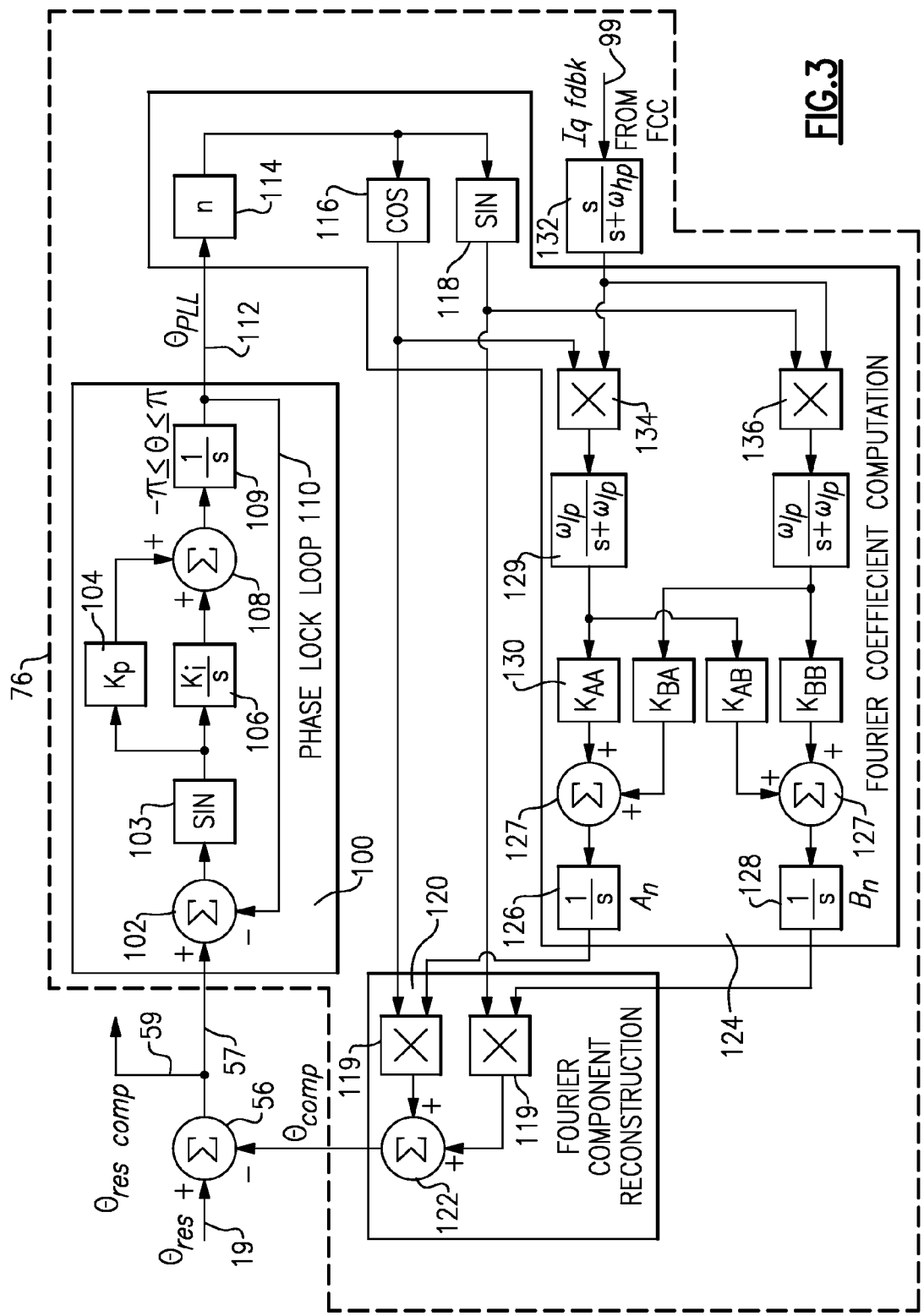
FIG. 3 shows a first embodiment synchronous compensator.
Figure 4:
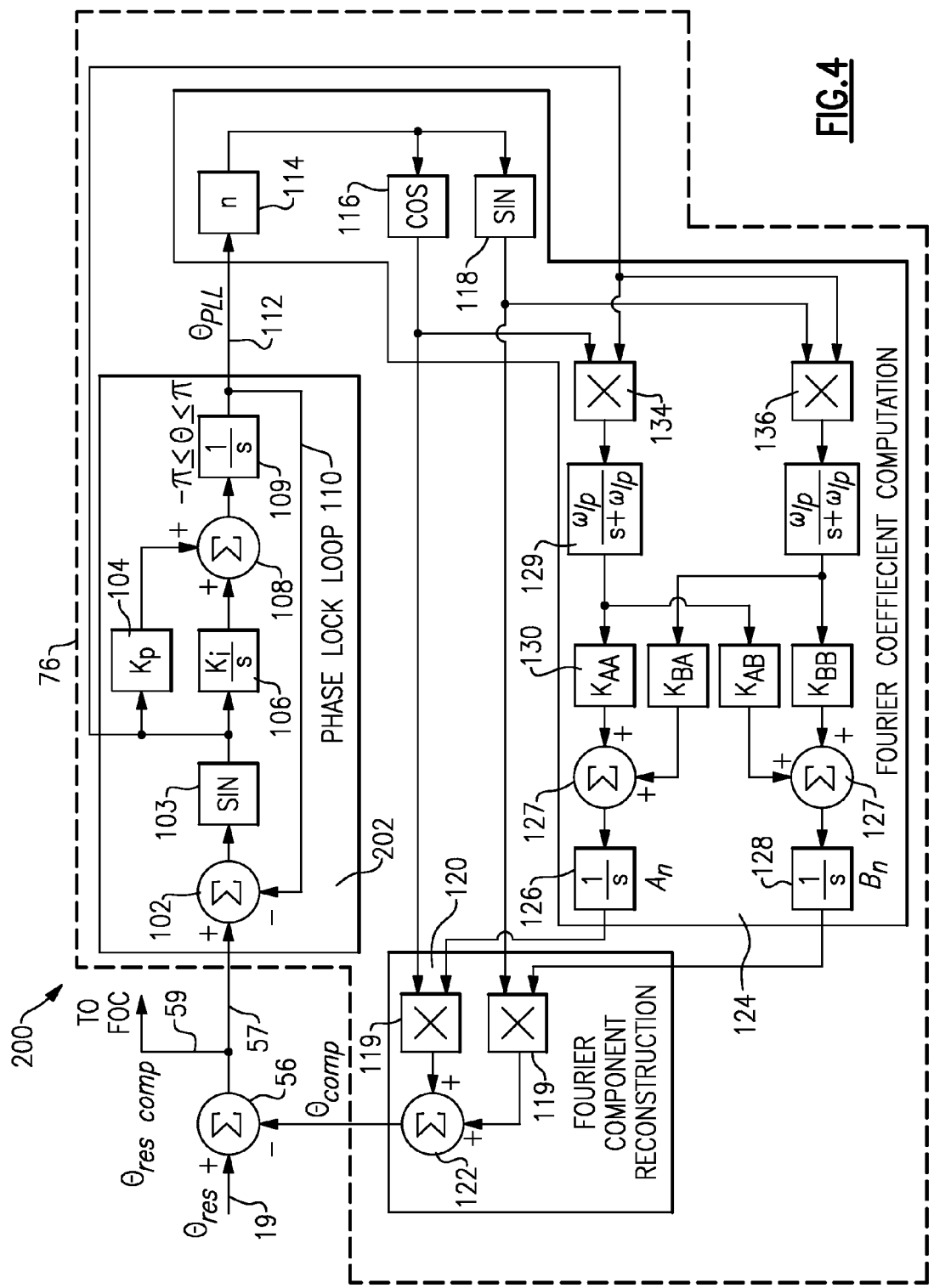
FIG. 4 shows a second embodiment synchronous compensator.
Figure 5:
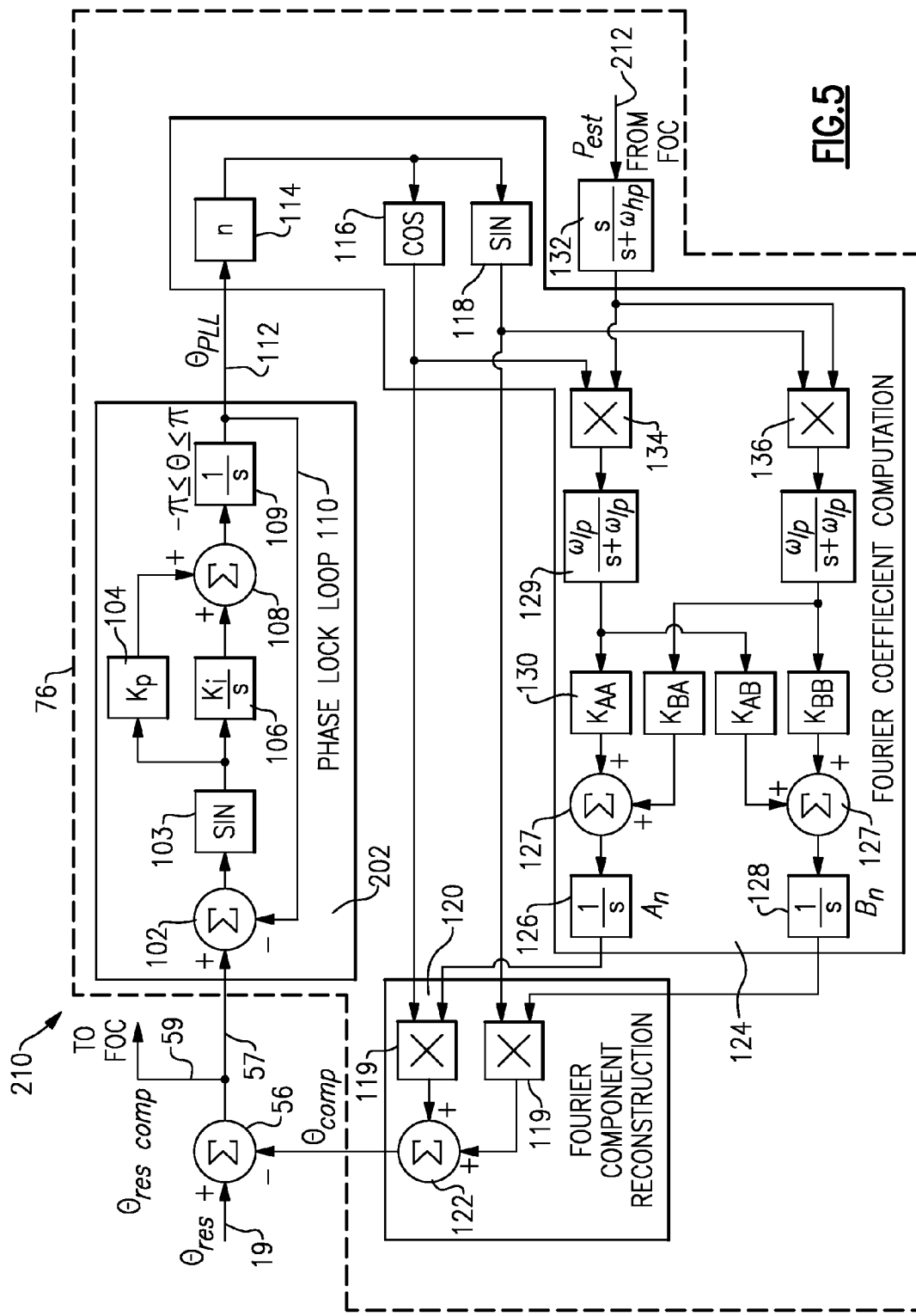
FIG. 5 shows a third embodiment.

FIGS. 3 through 5 show examples of the synchronous compensator 76. As shown, the $\theta_{res}$ resolver angle signal 19 passes to the resolver compensation summation block 56, the output of which is passed as the signal 57 into the synchronous compensator 76. FIG. 3 is the block diagram of one manifestation of the synchronous compensator 76. There are three major subsections to the synchronous compensator: 1) phase lock loop (PLL) 100; 2) Fourier coefficient computation 124; and 3) Fourier component reconstruction 120. The PLL 100 provides a filtered estimate of the resolver angle and is included in a feedback loop. The Fourier coefficient computation 124 determines the sine and cosine coefficients of a signal the selected harmonic content of which is to be minimized. For the FIG. 3 synchronous compensator example, the q-axis or torque producing current, $I_q$, is shown as the signal the selected harmonic content of which is to be minimized. As explained below, depending on the motor and load operating characteristics other signals may be preferable.

The signal the selected harmonic content of which is to be minimized is first high pass filtered in block 132 to remove the DC content. This high pass filtered signal is then multiplied in blocks 136 and 134 by the sine and cosine of the filtered resolver angle output from the PLL multiplied by the particular resolver angle harmonic to be minimized, e.g., the $2^{nd}$ harmonic, said sine and cosine taken at blocks 118 and 116, respectively. These two products, 134 and 136, are then low pass filtered in blocks 129 to provide time averaged values of the two signals and to remove undesirable harmonic content. The block 114 multiplies the filtered resolver angle at the output of the PLL 100 by the order of the harmonic that is targeted to be minimized. For example, if the second harmonic of the resolver is the targeted harmonic, the "n" would equal two. On the other hand, if the first harmonic is the targeted harmonic, the "n" would equal one.

The desired content of these two signals is the time averaged value of the two products output from 134 and 136. The time averaged values represent the Fourier cosine and sine coefficients respectively of the harmonic content at the particular harmonic to be minimized that are present in the signal, which is to be minimized. If a signal containing both cosine and sine signals at some frequency is multiplied individually by cosine and sine signals at the same frequency, then the output of the cosine multiplication will contain a cosine squared term and a cosine times sine term and the output of the sine multiplication will contain a sine squared term and a cosine times sine term. It is well known from trigonometric identities that the average value of both the cosine squared and sine squared terms is proportional to the product of the amplitudes of the constituent cosine and sine terms, while the average value of the cosine times sine terms is zero.

The outputs of these low pass filters are then input into two integrators, 126 and 128, through direct and cross coupling coefficients 130 and summation blocks 127. These coefficients are selected through knowledge of the dynamics associated with the specific signal in order to insure robust stability margins for the closed loop containing the Fourier coefficient computation block 124. It should be recognized that the gains are selected to provide a slow trim so as to not interfere with the motor controller operation. The outputs of the two integrators 126 and 128, $A_n$ and $B_n$, are the cosine and sine coefficients, respectively, of the signal the selected harmonic content of which is to be minimized.

The outputs of the integrators 126 and 128 are configured to start at zero, and to integrate up or down as required. The outputs of the integrators 126 and 128 are fed to the Fourier component reconstruction block 120 where they are multiplied at blocks 119 by the outputs of the cosine block 116 and sine block 118, respectively. The outputs of blocks 119 are the cosine and sine components at the selected resolver harmonic that are present in the signal the harmonic content of which is to be minimized. These Fourier component signals are added at summation block 122 to produce the total harmonic content, cosine and sine terms, in the selected signal at the target resolver harmonic. Due to the feedback loop architecture, the integrators will keep integrating until such time as there is no average harmonic content at the target frequency in the signal whose harmonic content is to be minimized.

There are broadly speaking three major categories of motor rotor synchronous disturbances addressed by this invention. The first of these is for applications wherein the load is smooth and contains negligible synchronously pulsating torque content at the problematic synchronous disturbance frequencies. For this broad category the only significant source of synchronous disturbances are those due to resolver synchronous errors. This first category will be called smooth torque. The second broad category includes applications that have significant synchronously pulsating torque content but for which the motor/load rotor inertia is sufficient to keep speed modulation at the synchronous disturbance frequencies to a small enough level that suppressing the synchronous disturbances in the motor torque effectively suppresses the synchronous disturbances in motor power as well. This second broad category will be called cyclic torque/smooth speed. The third and final broad category includes applications with synchronously pulsating torque that results in significant enough speed modulation at the synchronous disturbance frequency that suppressing the synchronous disturbance in motor torque does not suppress the synchronous disturbance in motor power. This third broad category will be called cyclic torque/cyclic speed.

The synchronous compensator shown in FIG. 3 belongs to the second application category, i.e., cyclic torque/smooth speed. The q-axis or torque producing current, $I_q$ 99, as computed from the motor current measurements following the well known Clarke and Park transforms is a good measurement of the motor torque for a motor operating under FOC. Further if the motor speed is fairly steady at the resolver cyclic disturbance and the load pulsation frequencies, the q-axis current, appropriately scaled, is a good indication of electrical power into the motor, since the efficiency of the overall power conversion from electrical in to mechanical out is high. Under these conditions, suppressing synchronous disturbances in q-axis current will suppress synchronous disturbances at the targeted frequency in the input power.

Phase lock loop 100 includes a resolver angle error summation block 102, which generates the difference between the compensated resolver angle $\theta_{rescomp}$ and the PLL output angle $\theta_{PLL}$. This difference or error is fed to a sine function 103 in order to prevent angle wrap from introducing step disturbances into the PLL. The smooth output of the sine function 103 is led to a proportional gain block 104, and an integrator block 106 that when combined in summation block 108 form a proportional plus integral control function. The output of block 108 represents a filtered estimate of the resolver angular velocity, which when passed downstream through an integrator block 109 generates a signal $\theta_{PLL}$ 112, representing a filtered estimate of the resolver angle $\theta_s$, which passes to Fourier coefficient computation 124.

The synchronous compensator can be tailored to suppress any number of synchronous or harmonic disturbances. In the FIG. 3 embodiment, it is configured to remove harmonic or synchronous oscillation on the $I_q$ component, by taking in as an input the $I_{Qfdbk}$ signal 99.

FIG. 4 illustrates a synchronous compensator 200 for type 1 (as previously defined), smooth load torque. As seen in the figure, the signal whose selected harmonic content is to be minimized is the output of the resolver angle error summer 102 in the PLL 202. For this configuration the Fourier coefficient integrators 126 and 128 will continue integrating until such time as the time average harmonic content in the output of resolver angle error summer 102 at the target resolver harmonic is zero. The gains in blocks 104 and 106 are tuned to result in a bandpass frequency for the PLL 202 that is below the targeted harmonic frequency such that the output of resolver angle summer 102 following smoothing by sine block 103 to remove wrapping discontinuities is a good estimate of the harmonic content in the resolver angle at that target frequency. The direct and cross coupled gains are in general different from those described for the configuration in FIG. 3 and are selected through knowledge of the dynamics associated with the PLL 202 in order to insure robust stability margins for the closed loop containing the Fourier coefficient computation 124. Also note that the high pass filter block 132 of FIG. 3 has been removed in FIG. 4 as the PLL error contains no DC content naturally.

While the FIG. 4 synchronous compensator is disclosed as part of a motor system, it would have application to any system wherein it would be desirable to remove a target harmonic content from a resolver signal.

FIG. 5 shows the synchronous compensator 210 for type 3 (as previously defined), cyclic torque/cyclic speed. The signal the selected harmonic content of which is to be minimized is now shown as $P_{est}$ 212, which refers to an estimate of power, either mechanical or electrical. The compensator architecture is identical to that shown in FIG. 3 in all other respects. There are many ways to provide a power estimate including the product of a torque estimate and speed, the product of DC voltage and current, and the electric power as determined in the dq reference frame, namely $V_d{*}I_d+V_q{*}I_q$. It should be understood that use of other means to provide an estimate of power somewhere in the overall power transfer path from input to output although not explicitly enumerated herein are included in this invention disclosure.

The synchronous compensator 76 for all three configurations identified has been shown for a single, generic nth harmonic suppression. For instances where more than one synchronous harmonic is to be suppressed, multiple instances of the Fourier Coefficient Computation and Fourier Component Reconstruction blocks can be included in any of the synchronous compensator architectures shown in FIGS. 3 though 5. These multiple Fourier Coefficient Computation and Fourier Component Reconstruction blocks operate independent of each other and as stated above independent of the fundamental motor controller loops. The multiple Fourier Coefficient Computation and Fourier Component Reconstruction blocks will identify the selected harmonic content and work to slowly trim that content from the signal the harmonic content of which is to be minimized. The operation of the variable speed drive (VSD) control loops is not altered and the original control objectives are not compromised just as for a single instance of the synchronous compensator.

The circuits as disclosed in this application are readily applicable for use with a permanent magnet synchronous motor. Furthermore, the inventive subject matter disclosed herein may have broad application to the general class of poly-phase AC motors.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A variable speed drive for an electric motor comprising:
an inverter for receiving pulse width modulation controls, said inverter for communicating power signals to a poly-phase motor;
a resolver for communicating signals from said poly-phase motor back to a motor control;
the motor control including a speed control, a field-oriented control, and a pulse width modulation drive for driving said inverter, and said resolver being connected to said speed control and to said field-oriented control, and said resolver further communicating with a synchronous compensator, said synchronous compensator being configured to drive harmonic content of at least one target harmonic frequency in a selected signal towards zero over time;
said synchronous compensator including a Fourier coefficient computation, which communicates signals into a Fourier component reconstruction, with said signals from said Fourier component reconstruction being communicated to a summation block along with an angular feedback signal from said resolver; and
the output of said summation signal passing into a phase lock loop circuit, said phase lock loop circuit providing a filtered signal of an angular position of the poly-phase motor into the Fourier coefficient computation.

2. The variable speed drive as set forth in claim 1, wherein said selected signal is a current signal.

3. The variable speed drive as set forth in claim 2, wherein said current signal is a torque producing current signal.

4. The variable speed drive as set forth in claim 3, wherein an input for said synchronous compensator is a feedback signal of the torque producing current signal.

5. The variable speed drive as set forth in claim 1, wherein said selected signal is an angle signal.

6. The variable speed drive as set forth in claim 5, wherein said selected signal is sampled downstream of a sine block, to provide said angle signal.

7. The variable speed drive as set forth in claim 1, wherein said selected signal is a power signal.

8. The variable speed drive as set forth in claim 7, wherein said power signal is an estimate of actual power.

9. The variable speed drive as set forth in claim 1, wherein said Fourier coefficient computation determines a sine and cosine coefficient of the selected signal.

10. The variable speed drive as set forth in claim 1, wherein said Fourier coefficient computation determines a sine and cosine coefficient of the selected signal.

11. A motor and drive assembly comprising:
a poly-phase motor driving a load;
a motor drive including an inverter for receiving pulse width modulation controls, said inverter for communicating power signals to the poly-phase motor;
a resolver communicating signals from said poly-phase motor back to a motor control;
the motor control including a speed control, a field-oriented control, and a pulse width modulation drive for driving said inverter, and said resolver being connected to said speed control and to said field-oriented control, and said resolver further communicating with a synchronous compensator, said synchronous compensator being configured to drive harmonic content of at least one target harmonic frequency in a selected signal to zero over time; and
a summation block is positioned between said resolver and said synchronous compensator, said resolver sending a signal to said summation block, including at least an angular component, and said summation block communicating an output to said synchronous compensator, and providing said communication between said resolver and said synchronous compensator, and an output of said synchronous compensator providing a signal including at least information with regard to an angular component back to said summation block, to drive harmonic content of at least one target harmonic frequency in a selected signal toward zero over time.

12. The motor and drive assembly as set forth in claim 11, wherein said load has a cyclic torque component.

13. The motor and drive assembly as set forth in claim 12, wherein said load is one of a positive displacement pump and compressor.

14. A synchronous compensator and resolver combination comprising:
a resolver to sense a position, and provide a feedback signal into a synchronous compensator;
said synchronous compensator being configured to drive a harmonic content of at least one target harmonic frequency in said feedback signal from said resolver toward zero over time;
said synchronous compensator includes a Fourier coefficient computation, which communicates signals into a Fourier component reconstruction, with said signals from said Fourier component reconstruction being communicated to a summation block along with an angular feedback signal from said resolver; and
the output of said summation signal passes into a phase lock loop circuit, said phase lock loop providing an error signal of an angular position of a motor into the Fourier coefficient computation.

15. The synchronous compensator and resolver combination as set forth in claim 14, wherein said Fourier coefficient computation determines a sine and cosine coefficient of the selected signal.

16. The synchronous compensator and resolver combination as set forth in claim 14, wherein said Fourier coefficient computation determines a sine and cosine coefficient of the selected signal.

17. A variable speed drive for an electric motor comprising:
an inverter for receiving pulse width modulation controls, said inverter for communicating power signals to a poly-phase motor,
a resolver for communicating signals from said poly-phase motor back to a motor control;
the motor control including a speed control, a field-oriented control, and a pulse width modulation drive for driving said inverter, and said resolver being connected to said speed control and to said field-oriented control, and said resolver further communicating with a synchronous compensator, said synchronous compensator being configured to drive harmonic content of at least one target harmonic frequency in a selected signal towards zero over time; and
a summation block is positioned between said resolver and said synchronous compensator, said resolver sending a signal to said summation block, including at least an angular component, and said summation block communicating an output to said synchronous compensator, and providing said communication between said resolver and said synchronous compensator, and an output of said synchronous compensator providing a signal including at least information with regard to an angular component back to said summation block, to drive harmonic content of at least one target harmonic frequency in a selected signal toward zero over time.

18. A synchronous compensator and resolver combination comprising:
a resolver to sense a position, and provide a feedback signal into a synchronous compensator; said synchronous compensator being configured to drive a harmonic content of at least one target harmonic frequency in said feedback signal from said resolver toward zero over time; and
wherein a summation block is positioned between said resolver and said synchronous compensator, said resolver sending a signal to said summation block, including at least an angular component, and said summation block communicating an output to said synchronous compensator, and providing said communication between said resolver and said synchronous compensator, and an output of said synchronous compensator providing a signal including at least information with regard to an angular component back to said summation block, to drive harmonic content of at least one target harmonic frequency in a selected signal toward zero over time.

* * * * *